April 30, 1929.  F. L. CHERRY  1,711,195
HAM HOLDER
Filed Sept. 21, 1925  2 Sheets-Sheet 2

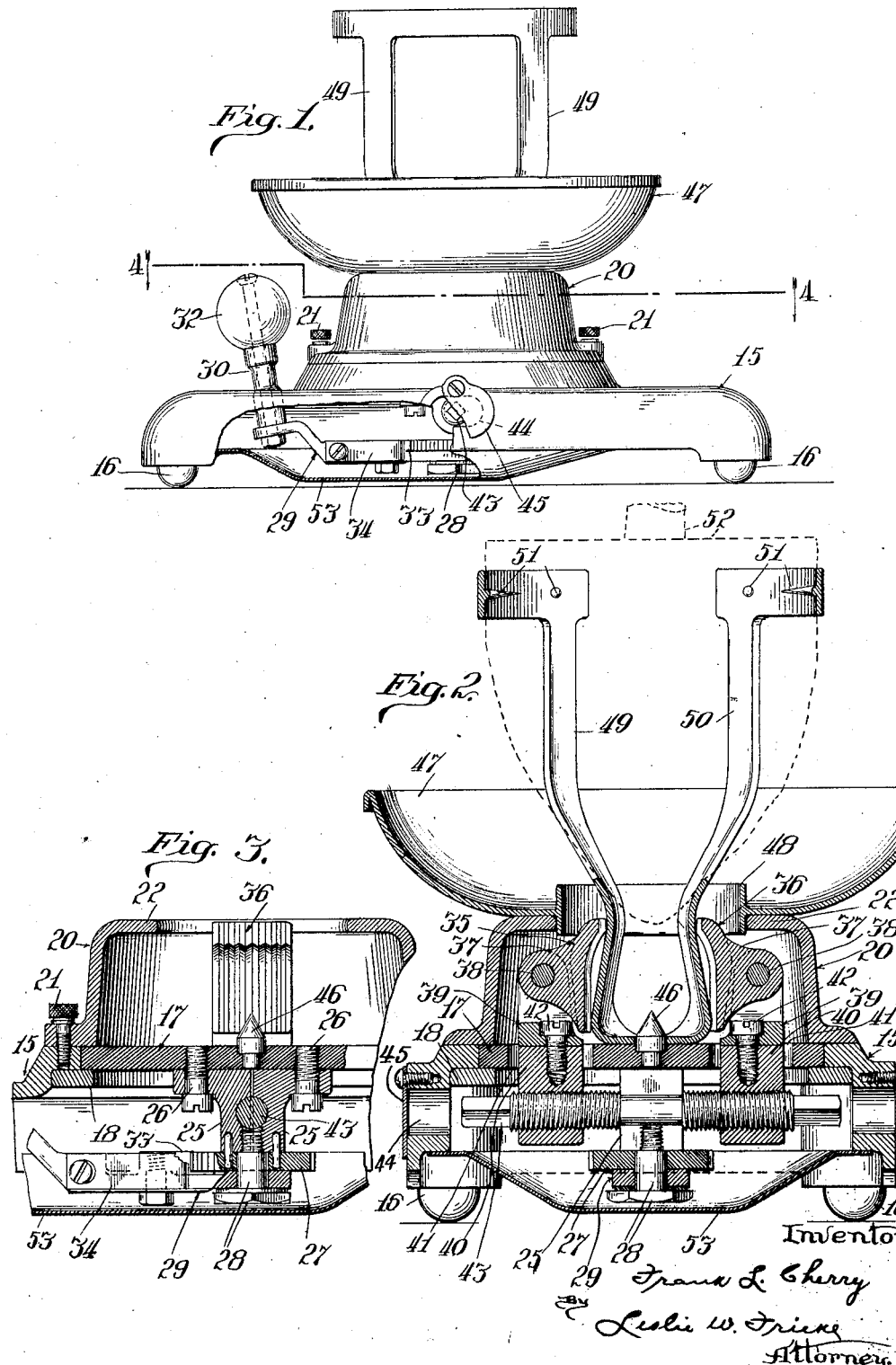

Inventor:
Frank L. Cherry
By Leslie W. Frick
Attorney

Patented Apr. 30, 1929.

1,711,195

UNITED STATES PATENT OFFICE.

FRANK L. CHERRY, OF CHICAGO, ILLINOIS, ASSIGNOR TO LESLIE W. FRICKE, OF OAK PARK, ILLINOIS.

HAM HOLDER.

Application filed September 21, 1925. Serial No. 57,511.

My invention relates to means for holding cooked hams or other pieces of meat adjustably in position for slicing. It is not an easy task for even the most accomplished cook to cut a cooked ham evenly into large even slices such as are desired for serving. Almost always there is more or less waste due to breaking the slices and it is the principal object of my invention to provide means for holding a ham in position and for turning it around as required so as to reduce to a minimum the waste in cutting.

To this end, it is one of the objects of my invention to provide new and improved means on a turn table for gripping the end of the bone of a ham, so arranged as to be capable of holding the bone rigidly in position for supporting the meat evenly for cutting. It is another object of my invention to provide new and improved auxiliary holding means to be used on the turn table for gripping the ham in case the bone is removed from the meat, or under other circumstances when desired, such auxiliary holding means being preferably of a type adapted to be tightened into operative holding position through the medium of the means by which normally the bone is gripped.

It is another object of my invention to provide braking means for the turn table of a device of this character by which the ham in position on the table may be held yieldingly by friction in adjusted position. It is another object to provide improved means for rotating the table, such means being preferably arranged for rotation of the table in either direction as may be desired so as to meet the requirements of the particular operator.

It is still another object of my invention to provide an improved form of base and support whereby it can be cleaned readily and kept in sanitary condition. It is another object to provide a pan or bowl extending around below the position of the ham on the table for catching the juices which escape.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings—

Fig. 1 is a side view of my improved device, partly broken away for the sake of clearness of illustration;

Fig. 2 is a central vertical section through my improved machine, showing in dotted lines a portion of a ham in position therein;

Fig. 3 is a fragmentary view, being a central vertical section taken at line 3—3 of Fig. 4;

Figure 6:
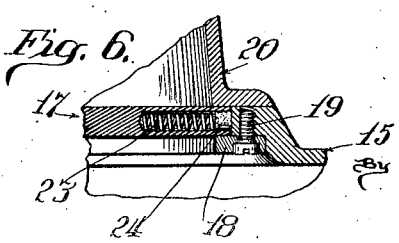
Fig. 6 is a fragmentary view being a cross section taken at line 6—6 of Fig. 4.

Referring to the several figures of the drawings in which corresponding parts are indicated by the same reference characters, 15 indicates a base in the form of a casting supported by standards 16 of any approved type. As is best shown in Fig. 2, the base 15 is provided at its upper face with a large central opening in which is revolubly mounted a turn table 17 which is supported by a ring 18 held in position by means of screws 19 as shown in Fig. 6. The turn table is held against withdrawal from the opening by a housing 20 which is secured by means of bolts 21 in position above the turn table, as is best shown in Fig. 3, the housing 20 being provided with an inwardly extending flange 22 at its upper end portion.

Figure 4:
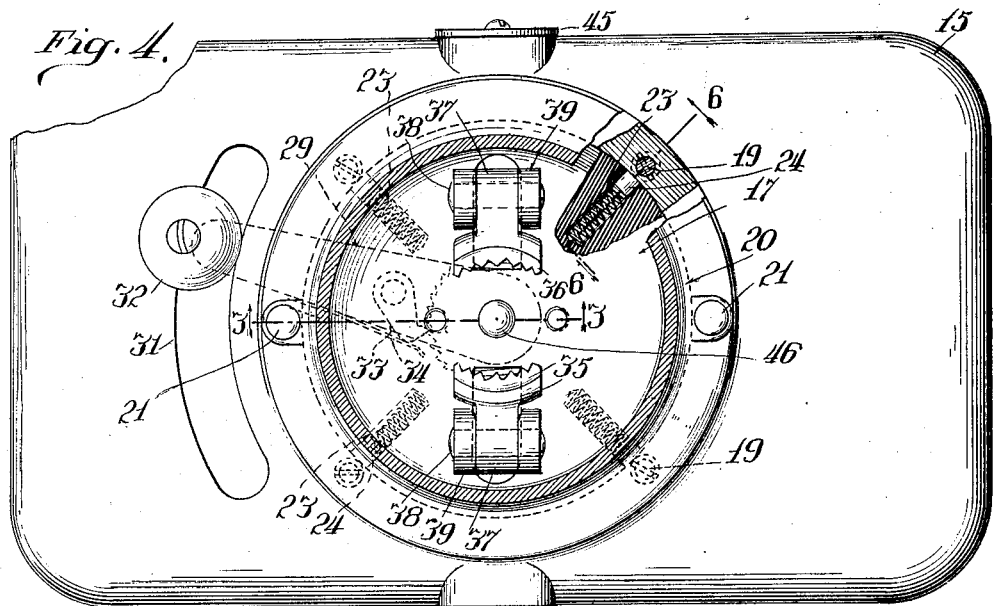
Fig. 4 is a horizontal sectional view taken substantially at line 4—4 of Fig. 1.

As is clearly shown in Figs. 4 and 6, the turn table 17 is provided with springs 23 in radial position therein within suitable openings in the edge of the table, such springs bearing at their outer ends against leather pads 24 which are pressed by the springs into contact with the inner face of the opening in the base 15, serving as a brake for controlling the rotation of the turn table by friction.

Figure 5:
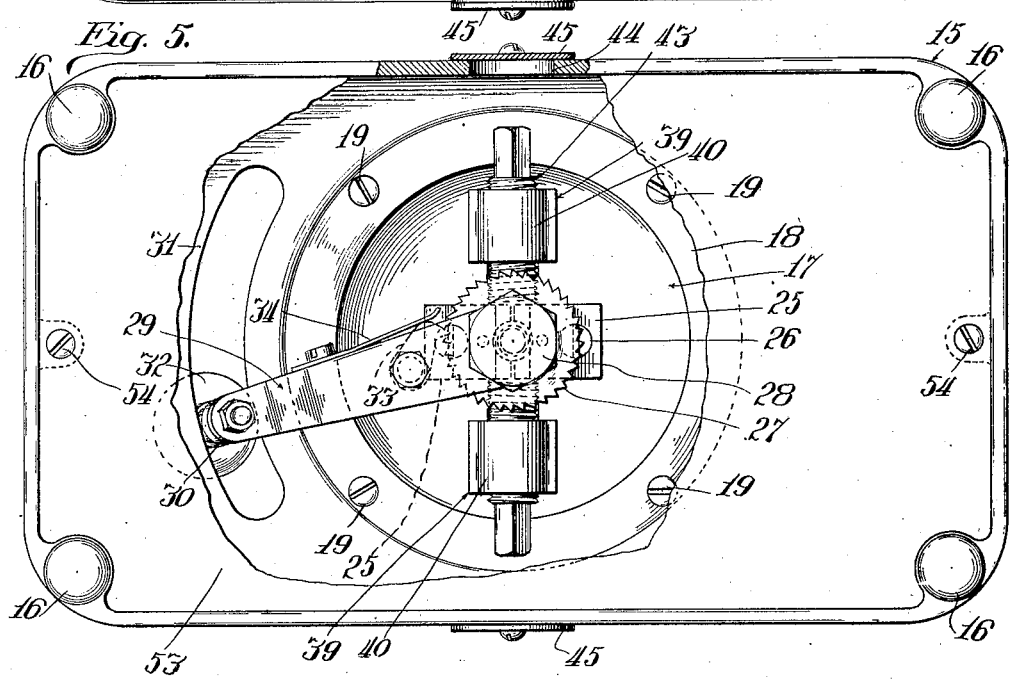
Fig. 5 is a bottom view of my improved machine, with a portion of the bottom plate removed.

Means is provided for rotating the turn table 17 in either direction as may be desired. This means comprises a two part bracket 25 secured by means of bolts 26 to the bottom face of the table 17 as best shown in Fig. 3, such bracket having a ratchet wheel 27 secured upon its lower end by means of a bolt 28. The bolt 28 also serves to secure pivotally in position a handle or lever 29 which extends radially therefrom, as is best shown in Fig. 5, the outer end of the lever 29 being provided with an upwardly directed portion 30 which extends through a slot 31 in the base 15, being provided at its upper end with a handle 32 of any approved type. The lever 29 is provided upon its upper face with a pivotally mounted pawl 33 which is held by a spring 34 in engagement with the teeth of the ratchet 27, the pawl being reversible upon the lever to correspond with the adjustment of the ratchet 27, means being provided also for securing the spring 34 upon the opposite face of the lever 29. The arrangement is such that when the lever 29 is reciprocated horizontally along the slot 31 the turn table is given a step by step rotation in one direction or the other, the pawl being adapted to slip over the teeth as the lever is swung in one direction and to engage the teeth when the lever is swung in the opposite direction. The direction of rotation of the table is controlled by the position of the ratchet 27 which is capable of being inverted so as to be used for rotation of the table in either direction as may be desired.

The means provided for holding the ham or other piece of cooked meat in position upon the turn table comprises two radially movable jaws 35 and 36, each of which is pivotally mounted in position by means of a lug 37 formed on its outer face and provided with an opening therethrough for receiving a pin 38 by which it is pivotally connected with a slide block 39, as is best shown in Fig. 2. Each of the slide blocks 39 comprises a lug 40 which extends upwardly through a radially disposed slot 41 in the turn table 17, in the construction shown the lug 40 being formed separately from the block and secured thereto by means of a screw 42. The lugs 40 are connected by means of a screw threaded rod 43, the screw threads upon opposite ends of which are differentially arranged so that upon rotation of the rod in one direction the jaws 35 and 36 are moved toward each other while upon rotation in the opposite direction the jaws are moved away from each other. Access is had to the squared end portions of the rod 43 through openings 44 in the base 15 for rotating the rod for adjusting the jaws, such openings 44 being normally closed by pivotally mounted plates 45.

As is clearly shown in Fig. 4, the inner faces of the jaws 35 and 36 are concaved vertically, being substantially arcuate in form so as to be moved into gripping engagement with a bone placed in position between the jaws, such bone being preferably centered in position by means of a pin 46 projecting upwardly from the center of the turn table 17. As is clearly shown in Fig. 2, the jaws are also concaved horizontally, having bearing parts projecting at both the top and bottom edges beyond the remaining portions of the inner faces of the jaws. By this arrangement, the jaws are adapted to adjust themselves automatically to the shape of the bone being gripped so as to hold the bone very firmly in position when the jaws are tightened upon opposite faces of the bone. As is best shown in Fig. 4, the inner faces of the jaws are serrated vertically for assisting them in gripping the bone or such other part as is inserted between them.

Resting upon the flange 22 of the housing 20 I have provided a pan or bowl 47 which is provided with a large central opening through the bottom, such opening being provided with a vertically arranged flange 48 which extends downwardly for engaging the opening in the flange 22 and extends upwardly into the bowl for enabling it to catch and hold particles of meat or juices from the ham or other meat being operated upon.

In case a limited amount of juice or fat should drop through the central opening of the bowl, access can be had to the jaws and the adjacent parts by the removal of the bolts 21 and the housing 20, the operator being thus enabled to keep the interior of the housing 20 in sanitary condition.

Auxiliary meat holding means is shown comprising two arms 49 and 50 which are formed integrally with each other from a piece of sheet metal stamped and bent into shape. As is clearly shown in Fig. 2, the free ends of the arms diverge, the outer ends being spaced some little distance apart and being curved with respect to each other so as to embrace the lower end of a ham between them for holding it securely in position. The outer ends are provided with inwardly extending pins 51 in position to enter the sides of a ham in position between the arms, such as the ham 52 indicated by dotted lines in said figure. The auxiliary holding device is provided with an opening between the inner ends of the arms for receiving the pin 46, whereby the device is held in centered position between the jaws 35 and 36. In the construction shown, the arms 49 and 50 are tightened against the ham by pressure upon the outer faces of the arms applied through the medium of the jaws 35 and 36.

When it is desired to operate upon a piece of meat, if such meat has a bone in central position, as in the case of a ham, the bone is inserted in contact with the pin 46 and the jaws 35 and 36 are tightened upon opposite faces of the bone, serving to hold the piece of meat very securely in position and above the turn table 17. The operator then proceeds to trim and slice the meat so held rigidly in position, being able to turn the piece of meat to any desired position through the use of the lever 29 as above described.

If the bone has been removed from the ham, or if a piece of meat is being operated upon which does not have a centrally disposed bone, the arms 49 and 50 are first placed in position between the jaws as indicated in Fig. 2. The piece of meat is then secured between the outer ends of the arms 49 and 50 and the jaws 35 and 36 are tightened against the arms for securing the piece of meat firmly in position.

In the construction shown I have provided a bottom plate 53 removably secured in position by means of screws 54, as is best shown in Fig. 5.

As will be readily understood, the arms 49 and 50 formed of sheet metal and joined at their converging ends by the intervening piece of metal comprise in effect a yoke, the arms of which are movable angularly toward and from each other, the arrangement being such that the arms preferably stand under normal conditions farther away from each other than in the position in which they grip the piece of meat, being forced into operative holding position against the resiliency of the metal from which they are made.

While I prefer to employ the construction as illustrated in the drawings and as above described, it will be understood that I do not desire to be limited to the form of construction as shown except so far as the same may be specifically claimed, since it is evident that changes may well be made in the form of construction without departing from the spirit of my invention.

I claim:

1. A meat holding device comprising a turn table, means mounted on said table for gripping the lower end portion of a piece of meat for holding it in operative position above the table, and a housing removably secured on the table about said gripping means.

2. A meat holding device comprising a turn table, means mounted on said table for gripping the lower end portion of a piece of meat for holding it in operative position above the table, a housing removably secured on the table about said gripping means, and means extending to one side below said housing for operating said gripping means.

3. A meat holding device comprising a turn table, means mounted on said table for gripping the lower end portion of a piece of meat for holding it in operative position above the table, and a bowl having a flanged opening in its bottom surrounding the lower end portion of the piece of meat.

4. A meat holding device comprising a turn table, means mounted on said table for gripping the lower end portion of a piece of meat for holding it in operative position above the table, a housing removably secured on the table about said gripping means, and a bowl having a flanged opening in its bottom secured on the upper end of the housing about the lower end portion of the piece of meat.

5. A meat holding device comprising a turn table, means mounted on said table for gripping the lower end portion of a piece of meat for holding it in operative position above the table, means for rotating said table, and braking means adapted frictionally to resist the rotation of the table.

6. A meat holding device comprising a turn table, means mounted on said table for gripping the lower end portion of a piece of meat for holding it in operative position above the table, a ratchet wheel connected with said table, a lever adapted to swing about the axis of said table, and a pawl carried by the lever adapted on a swinging motion of the lever in one direction to rotate the table by engagement with the ratchet.

7. A meat holding device comprising a turn table, an upwardly projecting pin at the axis of the table, jaws adjustable angularly on said table at opposite sides of the pin, and means for moving said jaws radially on said table into tight gripping engagement with the lower end portion of a bone resting on said pin.

8. A meat holding device comprising a turn table, an upwardly projecting pin at the axis of the table, jaws pivotally mounted on horizontal axes on said table at opposite sides of the pin, and means for moving said jaws toward each other into tight gripping engagement with a bone resting on said pin.

9. A meat holding device, comprising a turn table, jaws having concaved inner faces pivotally mounted independently of each other on horizontal axes on said table at opposite sides of the center thereof, and means for moving said jaws toward each other into tight gripping engagement with a bone resting in upright position on the table.

10. A meat holding device comprising a turn table, jaws pivotally mounted on horizontal axes on said table at opposite sides of the center thereof, each of said jaws having its inner face concaved both horizontally and vertically, and means for moving said jaws toward each other into tight gripping engagement with a bone in upright position on the table.

11. A meat holding device, comprising a base, a turn table rotatably mounted on said base, a ratchet wheel on the bottom face of the turn table, a lever swingingly mounted about the axis of said table, a handle on said lever extending upwardly through an arcuate slot in said base, a pawl on said lever adapted by engagement with said ratchet to rotate said turn table, and means on said table for holding a piece of meat in upright position above the table.

12. A meat holding device, comprising a turn table, a rod revolubly mounted on the lower face of said table, slide blocks mounted by means of screw threads on said rod and movable radially of said table toward each other upon rotation of the rod in one direction and movable away from each other upon rotation of the rod in the opposite direction, said slide blocks extending upwardly through radial slots in said table, and jaws mounted on said slide blocks for gripping the end of a bone therebetween.

13. A device for holding meat for slicing, comprising a pair of oppositely disposed spaced jaws pivotally mounted on horizontal axes, each of said jaws being formed on its face with gripping parts projecting beyond the body of the jaw both above and below the pivotal axis, and means for moving said jaws toward each other serving to cause them automatically to adjust themselves for gripping a bone extending downwardly between the jaws.

14. A device for holding meat for slicing, comprising a pair of oppositely disposed spaced jaws having horizontally perforated lugs on their outer faces, each of said jaws being hollowed out horizontally between its upper and lowered edges, means for pivotally mounting said jaws through the medium of said lugs, and means for moving the jaws toward each other for gripping a bone extending downwardly therebetween.

15. A device for holding meat for slicing, comprising oppositely disposed diverging arms movable angularly toward and from each other, pins on the inner faces of said arms at their outer end portions, and means adapted by pressure inwardly on said arms at their inner end portions to cause said arms and pins firmly to grip a piece of meat between them.

16. A device for holding meat for slicing, comprising two diverging arms formed integrally from a piece of sheet metal bent into shape, pins on the inner faces of said arms at their outer end portions, jaws between which the convergent joined ends of the arms are insertible, and means for moving the jaws toward each other for gripping the arms and causing them to press tightly against a piece of meat between the arms.

17. A device for holding meat for slicing, comprising two divergent arms formed integrally from a piece of sheet metal bent into shape, the outer end of each arm being fan shaped in outline and being curved so as to serve with the other arm for embracing a piece of meat placed between the arms, and means for pressing the arms toward each other for causing them firmly to grip a piece of meat.

18. A device for holding meat for slicing, comprising a yoke having divergent arms adapted to be moved angularly toward each other, a turn table upon which said yoke is mounted, an upwardly projecting pin passing through and opening in the yoke at its middle portion for centering the yoke on the table, and gripping means on the table adapted to be moved toward and from each other and adapted by pressure on the outer face of said arms to press the arms firmly into gripping engagement with a piece of meat between them.

FRANK L. CHERRY.